:

US009038068B2

(12) United States Patent
Engle et al.

(10) Patent No.: US 9,038,068 B2
(45) Date of Patent: May 19, 2015

(54) CAPACITY RECLAMATION AND RESOURCE ADJUSTMENT

(71) Applicant: Bank of America Corporation, Charlotte, NC (US)

(72) Inventors: Ronald Engle, Minooka, IL (US); Prentice O. Dees, Jr., Charlotte, NC (US); John Becsi, Atlanta, GA (US); Thomas H. Davies, Concord, CA (US); Darren Sanders, Chelmsford (GB); Timothy Golden, Oakland, CA (US); William Rouse, Hurst, TX (US)

(73) Assignee: Bank of America Corporation, Charlotte, NC (US)

( * ) Notice: Subject to any disclaimer, the term of this patent is extended or adjusted under 35 U.S.C. 154(b) by 345 days.

(21) Appl. No.: 13/678,414

(22) Filed: Nov. 15, 2012

(65) Prior Publication Data

US 2014/0137110 A1    May 15, 2014

(51) Int. Cl.
*G06F 9/50* (2006.01)
*G06F 9/455* (2006.01)

(52) U.S. Cl.
CPC ............... *G06F 9/5022* (2013.01); *G06F 9/50* (2013.01); *G06F 9/505* (2013.01); *G06F 9/455* (2013.01); *G06F 9/5072* (2013.01); *G06F 9/5077* (2013.01); *G06F 2209/508* (2013.01); *G06F 2209/5011* (2013.01)

(58) Field of Classification Search
None
See application file for complete search history.

(56) References Cited

U.S. PATENT DOCUMENTS

| 7,437,727 | B2* | 10/2008 | Leong et al. ................ 718/104 |
| 7,865,899 | B2* | 1/2011 | Kawamoto et al. ........... 718/105 |
| 8,046,767 | B2 | 10/2011 | Rolia et al. |
| 8,103,776 | B2 | 1/2012 | DeHaan |
| 8,171,201 | B1 | 5/2012 | Edwards, Sr. |
| 8,429,276 | B1* | 4/2013 | Kumar et al. ................ 709/226 |
| 8,572,611 | B2 | 10/2013 | Eide et al. |
| 2004/0181794 | A1 | 9/2004 | Coleman et al. |
| 2008/0155208 | A1 | 6/2008 | Hiltgen et al. |
| 2009/0254660 | A1 | 10/2009 | Hanson et al. |
| 2010/0057913 | A1 | 3/2010 | DeHaan |
| 2011/0225299 | A1* | 9/2011 | Nathuji et al. ............... 709/226 |
| 2011/0246627 | A1 | 10/2011 | Kern |

(Continued)

OTHER PUBLICATIONS

United Kngdom Search Report dated Apr. 14, 2014 for Application No. GB1319927.8.

*Primary Examiner* — Qing Wu
(74) *Attorney, Agent, or Firm* — Michael A. Springs; Moore & Van Allen, PLLC; Patrick B. Horne

(57) ABSTRACT

Embodiments of the invention are directed to a system, method, or computer program product for providing capacity reclamation of resources allocated to one or more virtual machines. The invention monitors resource usage of the one or more virtual machines over a predetermined period of time, compares resource usage to resource allocation; and, based on the comparison of the resource usage to the resource allocation, adjusts resource allocation based on the monitored resource usage. Comparing the resource usage may include comparing resource usage to a target upper threshold percentage of allocated resources, and if the resource usage exceeds the target upper threshold, increasing the allocated resources by a predetermined amount and comparing resource usage to a target lower threshold percentage of allocated resources, and if the resource usage is less than the target lower threshold, decreasing the allocated resources by a predetermined amount.

17 Claims, 10 Drawing Sheets

(56) References Cited

U.S. PATENT DOCUMENTS

| | | |
|---|---|---|
| 2011/0246992 A1 | 10/2011 | Kern |
| 2011/0258621 A1 | 10/2011 | Kern |
| 2012/0102291 A1 | 4/2012 | Cherian et al. |
| 2012/0131157 A1 | 5/2012 | Gospodarek et al. |
| 2012/0272237 A1 | 10/2012 | Baron |
| 2013/0125116 A1* | 5/2013 | Liu et al. .......... 718/1 |
| 2013/0198740 A1 | 8/2013 | Arroyo et al. |
| 2013/0275975 A1 | 10/2013 | Masuda et al. |
| 2013/0311989 A1* | 11/2013 | Ota et al. .......... 718/1 |
| 2014/0007097 A1* | 1/2014 | Chin et al. .......... 718/1 |
| 2014/0058871 A1* | 2/2014 | Marr et al. .......... 705/26.1 |
| 2014/0156925 A1 | 6/2014 | Baron et al. |

\* cited by examiner

CAPACITY RECLAMATION AND RESOURCE ADJUSTMENT

BACKGROUND

Traditional information technology infrastructures for entities usually require several operating environments, vendor resource deployment, authentication repositories and mechanisms, and several application servers working together in order to operate a large entity's information technology.

Furthermore installing and/or implementing core functions, such as new software or hardware within an entity's information technology infrastructure requires several time consuming steps. For example, ordering and installing a new physical server and/or associate work station requires a logical process to load the necessary operating systems, secure the server, install applications, ensure licensing from proper vendors, and the like. In some cases this process can take several weeks or months for the server(s) to become operational and business-ready for the entity.

Furthermore, the new physical server and/or associate work station may have hardware or software features that provide functionality to the physical server and/or associate work station that are not being utilized. For example, the associate work station may have a large amount of memory that the associate may have requested, but may not be utilized. Thus, the entity may be paying for information technology infrastructure that is not being utilized to its fullest capacity.

Therefore, a need exists for a logical management system of information technologies within an entity that drastically limits the time required for core functions to be completed and intelligently monitors the core functions once implemented.

BRIEF SUMMARY

The following presents a simplified summary of all embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of all embodiments in a simplified form as a prelude to the more detailed description that is presented later.

Embodiments of the invention address the above needs and/or achieve other advantages by providing apparatus (e.g., a system, computer program product, and/or other devices) and methods for providing an information technology build service for building a platform in response to a service request.

According to some embodiments of the invention, a system has a memory device with computer-readable program code stored thereon, a communication device, and a processing device operatively coupled to the memory device and the communication device. The processing device is configured to execute the computer-readable program code to monitor resource usage of the one or more virtual machines over a predetermined period of time; compare resource usage to resource allocation; and, based on the comparison of the resource usage to the resource allocation, adjust resource allocation based on the monitored resource usage.

In some embodiments, comparing resource usage to resource allocation comprises comparing resource usage to a target upper threshold percentage of allocated resources, and if the resource usage exceeds the target upper threshold, increasing the allocated resources by a predetermined amount. In some embodiments, comparing resource usage to resource allocation comprises comparing resource usage to a target lower threshold percentage of allocated resources, and if the resource usage is less than the target lower threshold, decreasing the allocated resources by a predetermined amount. In some embodiments, the processing device is further configured to execute the computer-readable program code to receive resource parameters from a requester; and provision resources for one or more virtual machines based at least in part on resource parameters received from requester. In some embodiments, the processing device is further configured to execute the computer-readable program code to detect that one or more of the one or more virtual machines have completed one or more tasks; and, in response to detecting that one or more of the one or more virtual machines have completed one or more tasks, reclaim some or all the resources allocated to the one or more virtual machines for performing the completed one or more tasks into a pool of available resources. In some embodiments, the processing device is further configured to execute the computer-readable program code to re-allocate some or all the reclaimed resources to a new virtual machine or an existing virtual machine. In some embodiments, comparing resource usage to resource allocation comprises comparing resource usage to a target upper threshold percentage of allocated resources, and if the resource usage exceeds the target upper threshold, increasing the allocated resources by a predetermined amount and comparing resource usage to a target lower threshold percentage of allocated resources, and if the resource usage is less than the target lower threshold, decreasing the allocated resources by a predetermined amount.

According to embodiments of the invention, a computer program product provides capacity reclamation of resources allocated to one or more virtual machines. The computer program product includes at least one non-transitory computer-readable medium having computer-readable program code portions embodied therein. The computer-readable program code portions include an executable portion configured for monitoring resource usage of the one or more virtual machines over a predetermined period of time, an executable portion configured for comparing resource usage to resource allocation and an executable portion configured for, based on the comparison of the resource usage to the resource allocation, adjusting resource allocation based on the monitored resource usage.

In some embodiments, comparing resource usage to resource allocation comprises comparing resource usage to a target upper threshold percentage of allocated resources, and if the resource usage exceeds the target upper threshold, increasing the allocated resources by a predetermined amount. In some embodiments, comparing resource usage to resource allocation comprises comparing resource usage to a target lower threshold percentage of allocated resources, and if the resource usage is less than the target lower threshold, decreasing the allocated resources by a predetermined amount. In some embodiments, the computer-readable program code portions further comprises an executable portion configured for receiving resource parameters from a requester; and an executable portion configured for provisioning resources for one or more virtual machines based at least in part on resource parameters received from requester. In some embodiments, the computer-readable program code portions further comprises an executable portion configured for detecting that one or more of the one or more virtual machines have completed one or more tasks; and an executable portion configured for, in response to detecting that one or more of the one or more virtual machines have completed one or more tasks, reclaiming some or all the resources allocated to the one or more virtual machines for performing the completed one or more tasks into a pool of available resources. In some embodiments, the computer-readable program code portions further comprises an executable portion configured for re-allocating some or all the reclaimed resources to a new virtual machine or an existing virtual machine. In some embodiments, comparing resource usage to resource allocation comprises comparing resource usage to a target upper threshold percentage of allocated resources, and if the resource usage exceeds the target upper threshold, increasing the allocated resources by a predetermined amount; and comparing resource usage to a target lower threshold percentage of allocated resources, and if the resource usage is less than the target lower threshold, decreasing the allocated resources by a predetermined amount.

According to embodiments of the invention, a computer-implemented method provides capacity reclamation of resources allocated to one or more virtual machines. The method is embodied in at least one non-transitory computer-readable medium having computer-readable program code embodied therein. The computer-readable program code causes a computer processor to monitor resource usage of the one or more virtual machines over a predetermined period of time, compare resource usage to resource allocation and, based on the comparison of the resource usage to the resource allocation, adjust resource allocation based on the monitored resource usage.

In some embodiments, comparing resource usage to resource allocation comprises comparing resource usage to a target upper threshold percentage of allocated resources, and if the resource usage exceeds the target upper threshold, increasing the allocated resources by a predetermined amount. In some embodiments, comparing resource usage to resource allocation comprises comparing resource usage to a target lower threshold percentage of allocated resources, and if the resource usage is less than the target lower threshold, decreasing the allocated resources by a predetermined amount. In some embodiments, the computer-readable program code to cause a computer processor to receive resource parameters from a requester; and provision resources for one or more virtual machines based at least in part on resource parameters received from requester. In some embodiments, the computer-readable program code to cause a computer processor to detect that one or more of the one or more virtual machines have completed one or more tasks; and, in response to detecting that one or more of the one or more virtual machines have completed one or more tasks, reclaim some or all the resources allocated to the one or more virtual machines for performing the completed one or more tasks into a pool of available resources. In some embodiments, the computer-readable program code to cause a computer processor to re-allocate some or all the reclaimed resources to a new virtual machine or an existing virtual machine.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
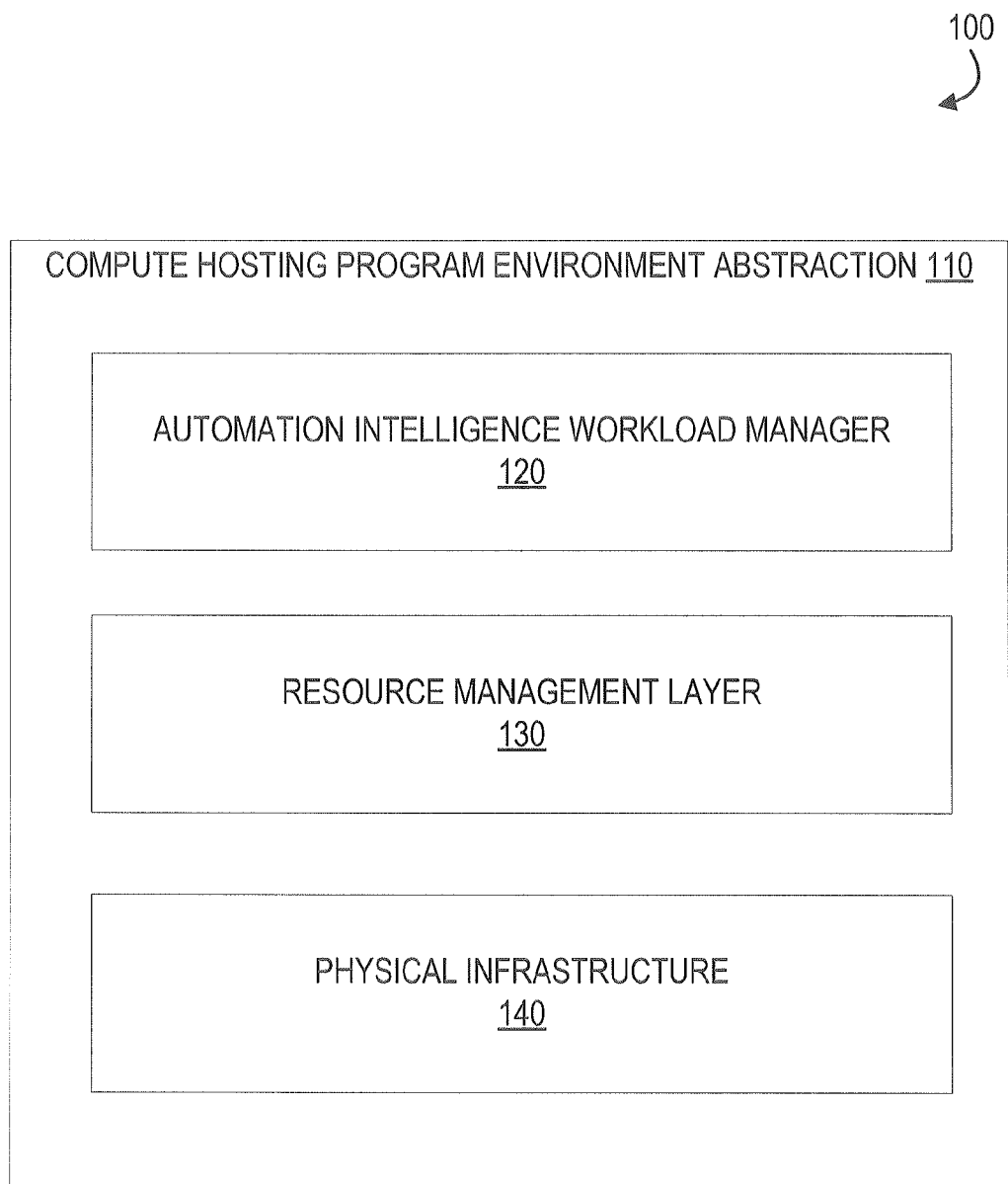
Figure 2:
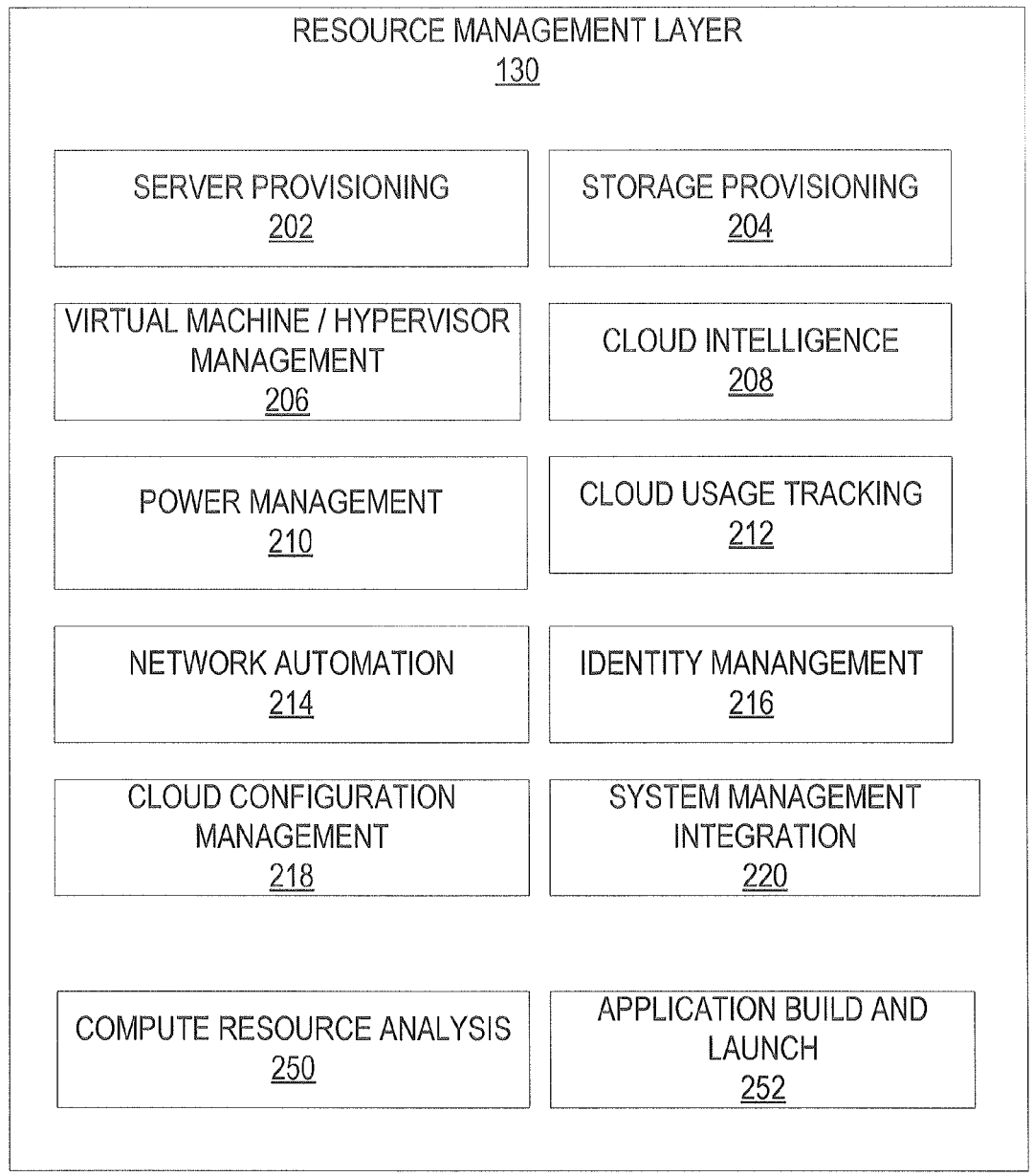
Figure 3:
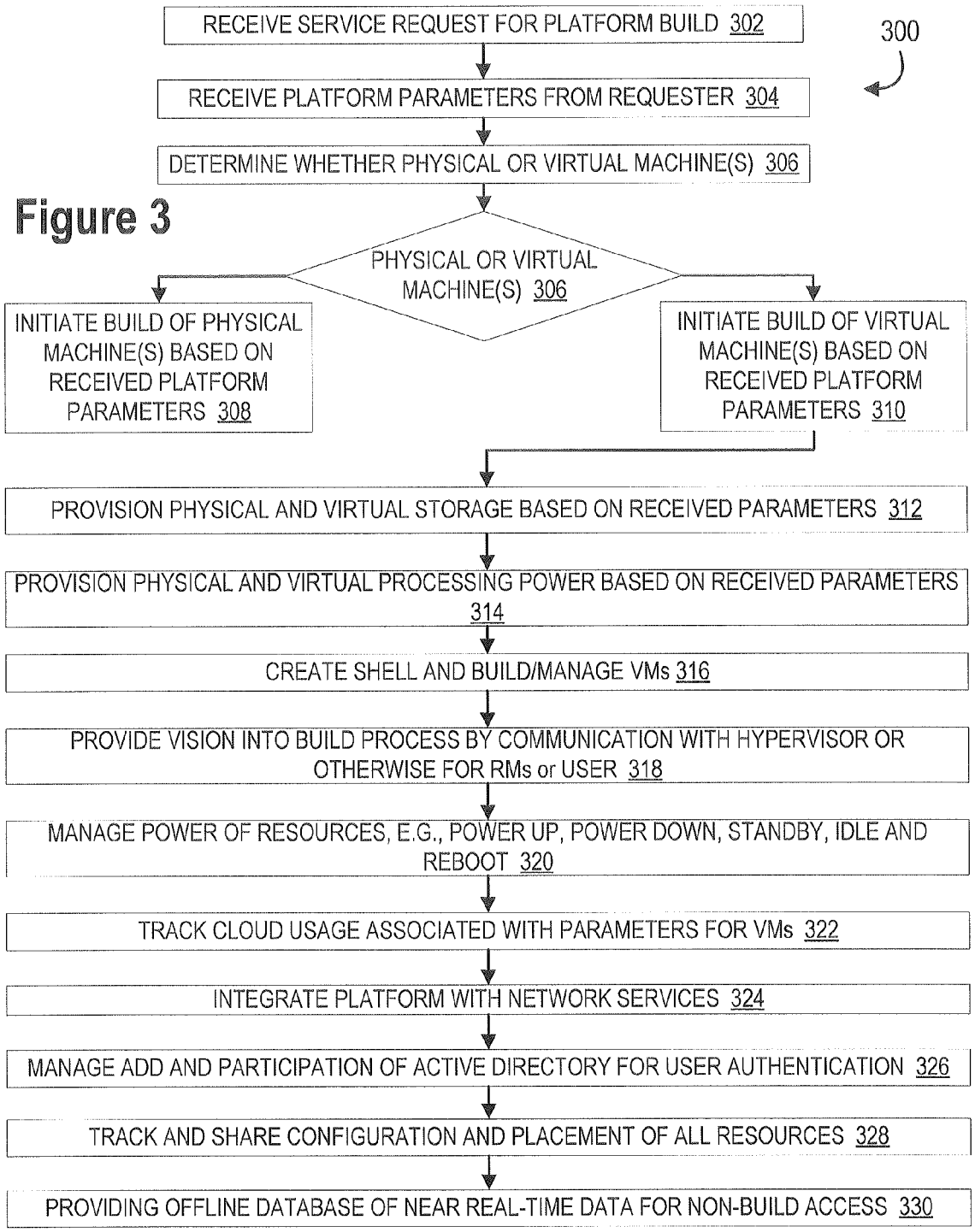
Figure 4:
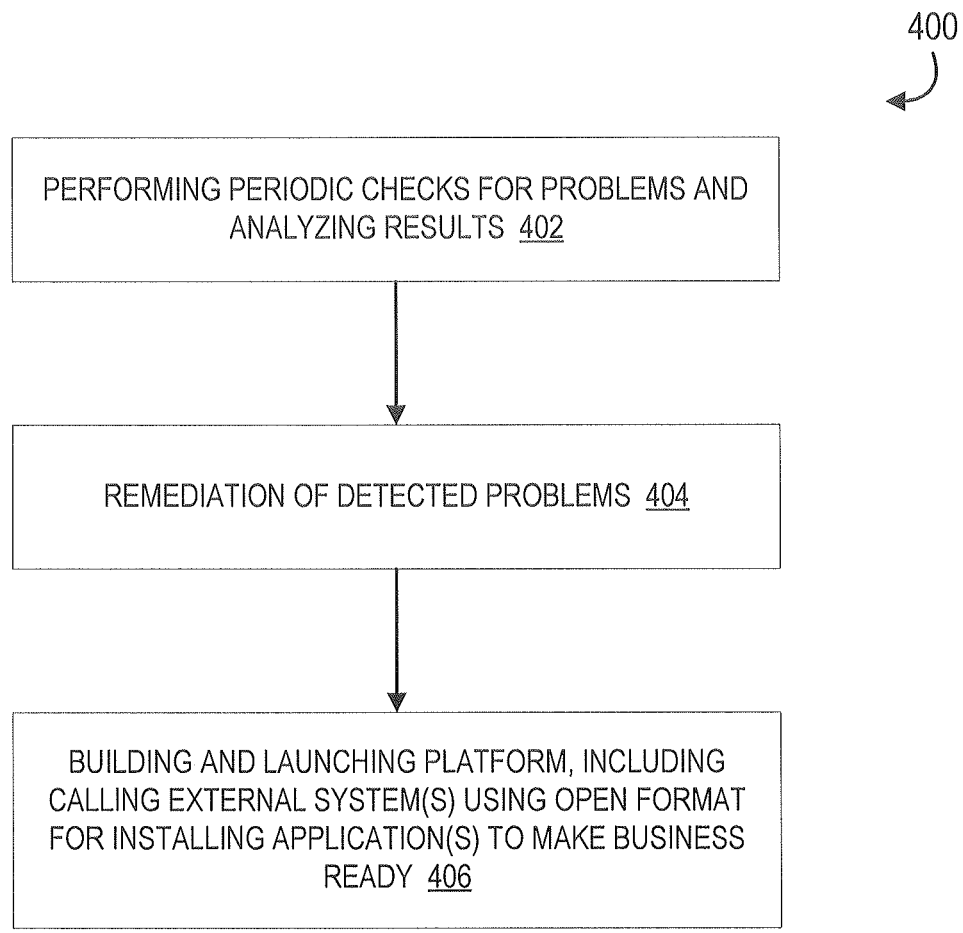
Figure 5:
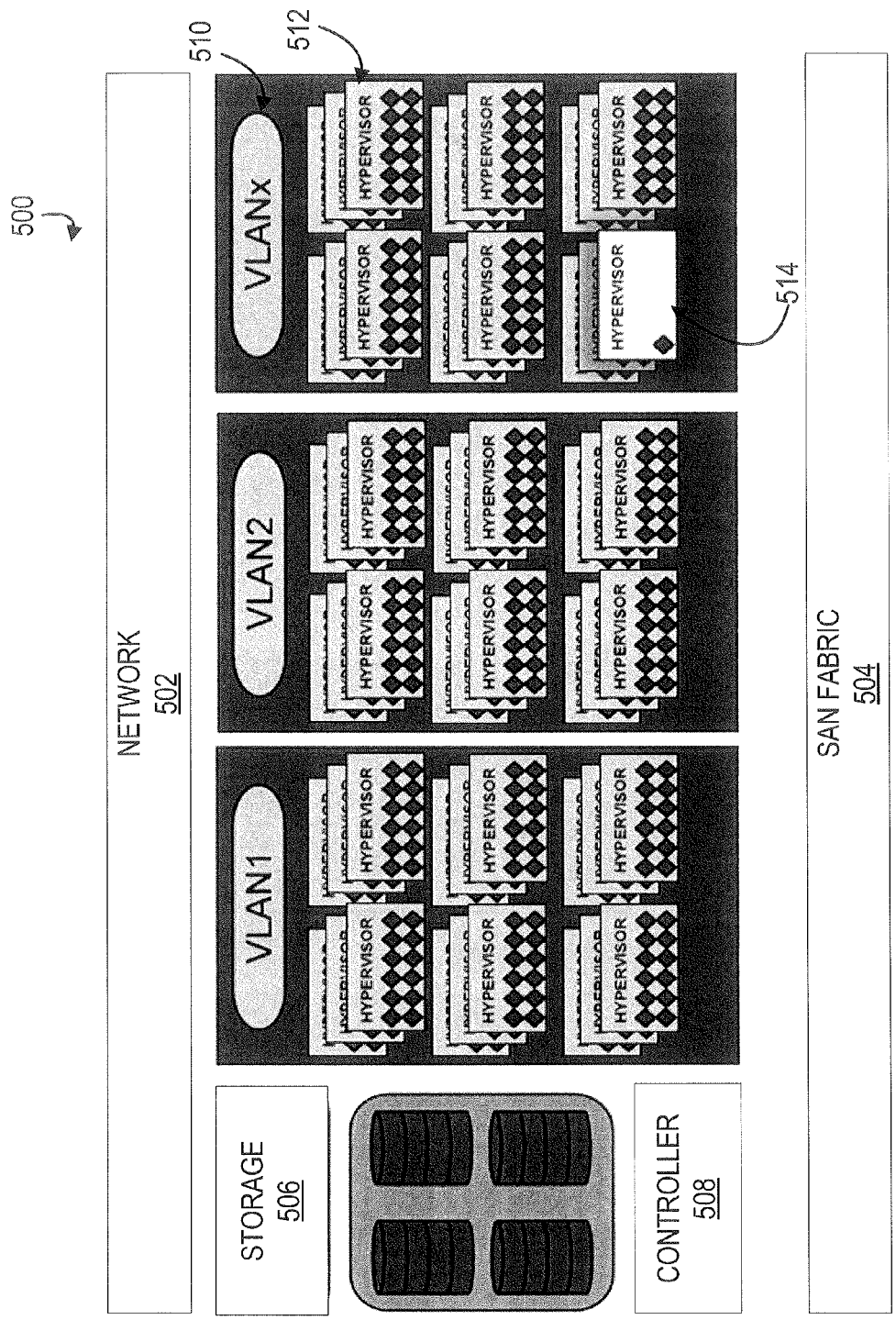
Figure 6:
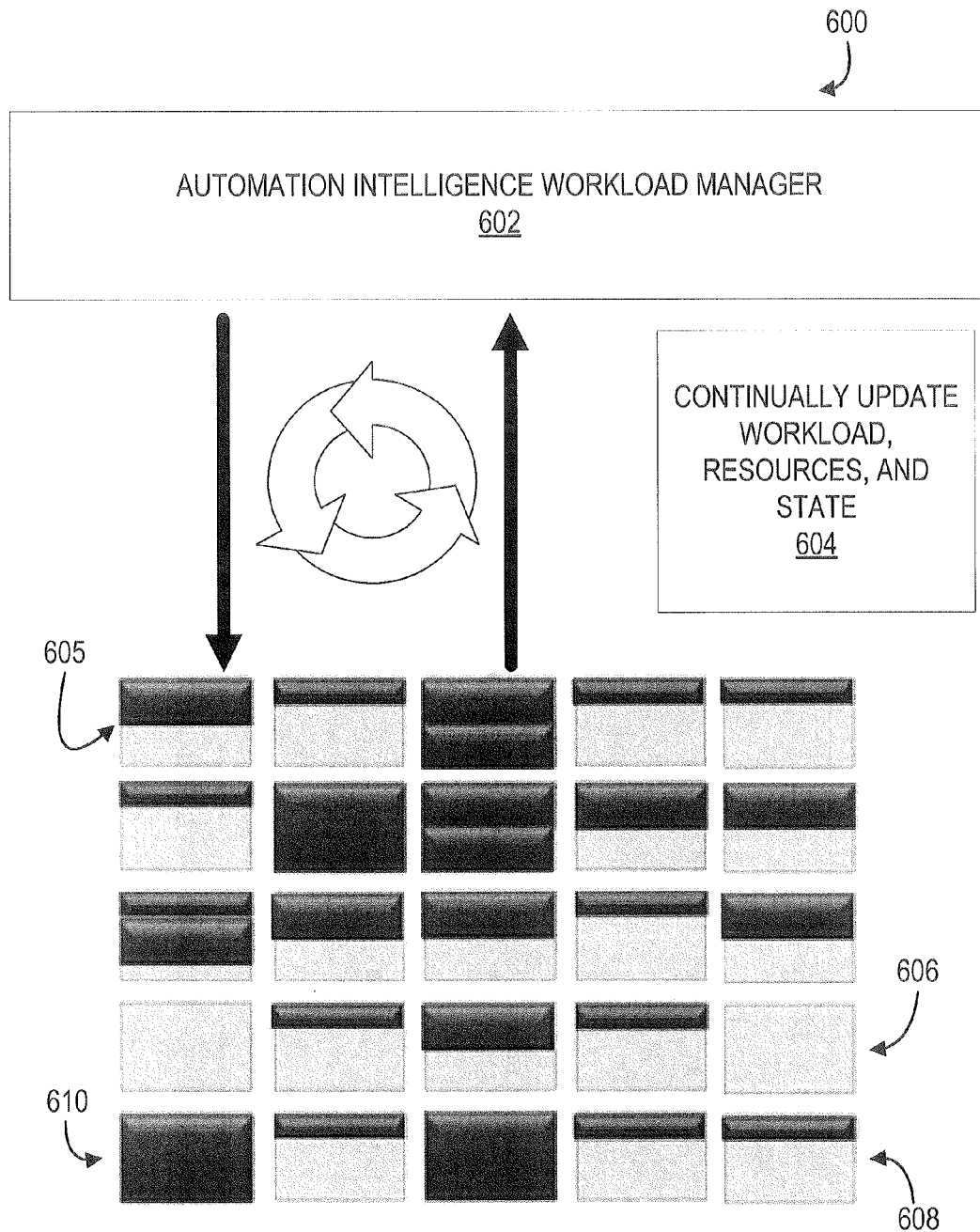
Figure 7:
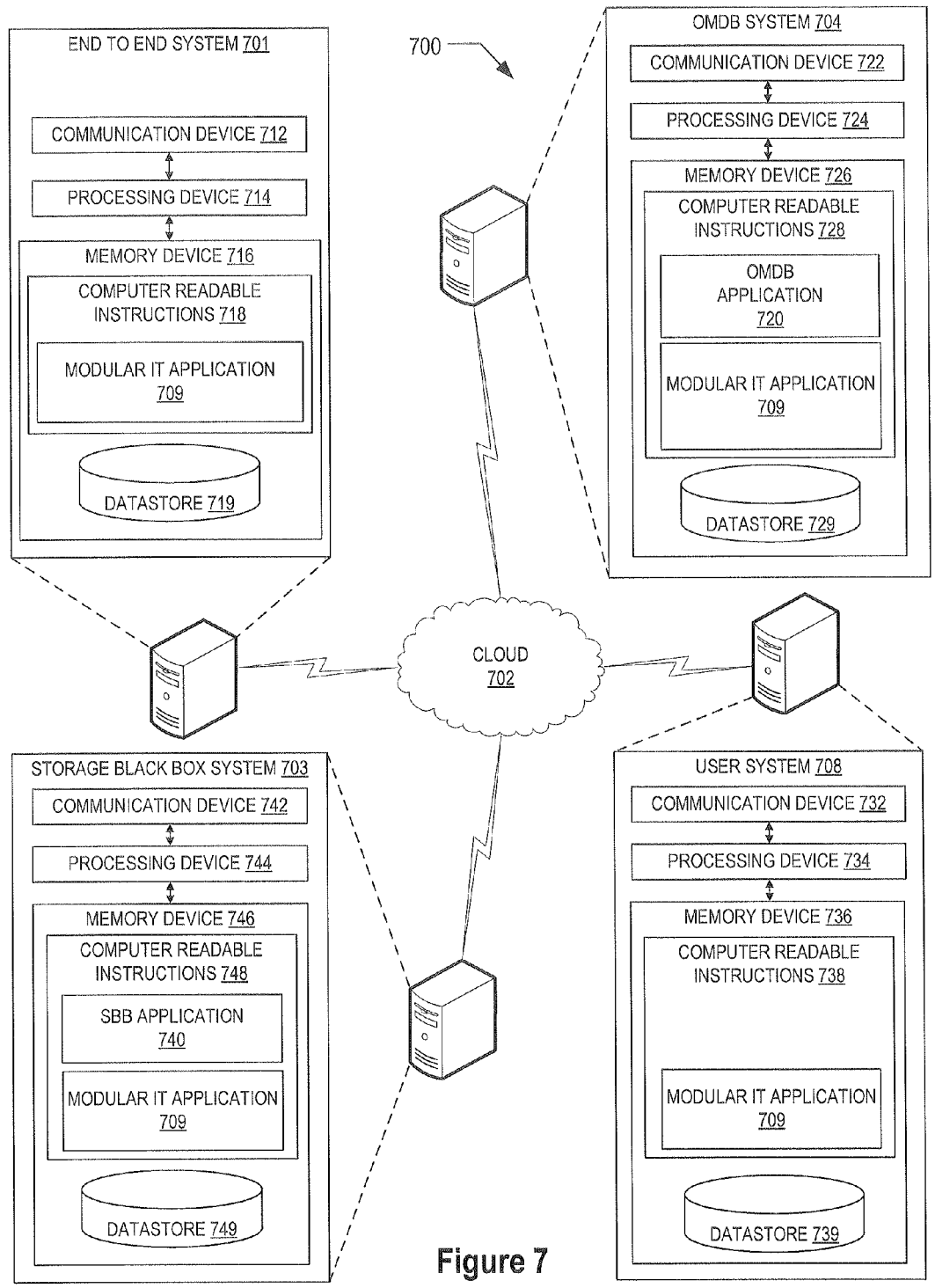
Figure 8:
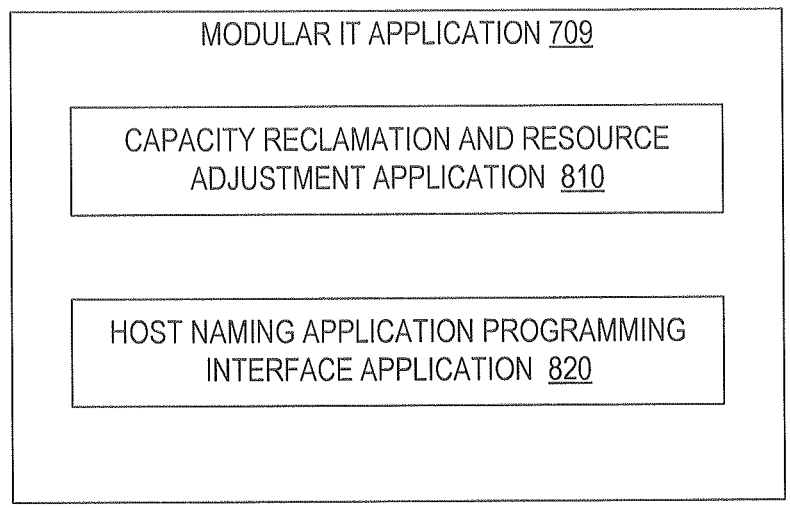
Figure 9:
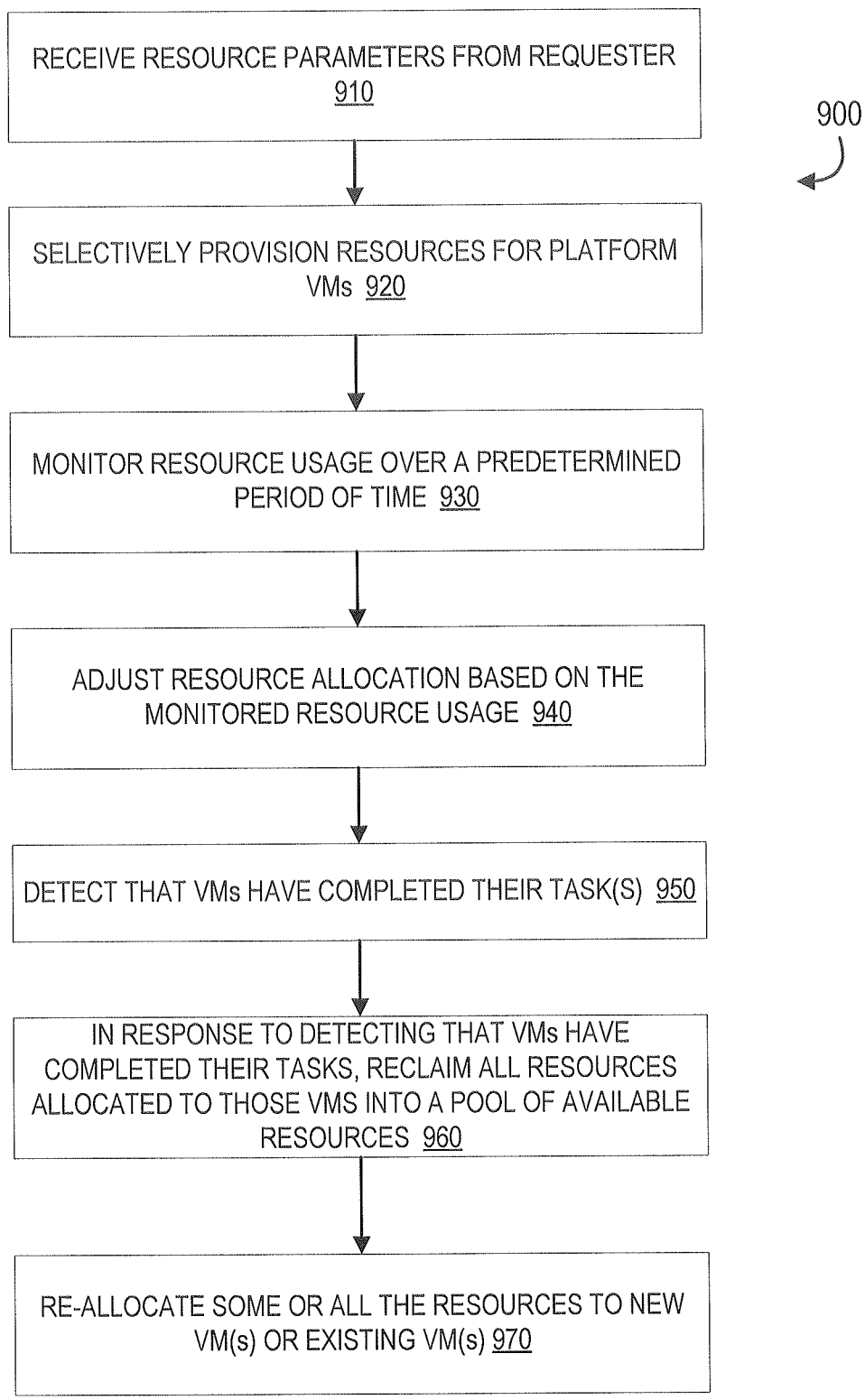
Figure 10:
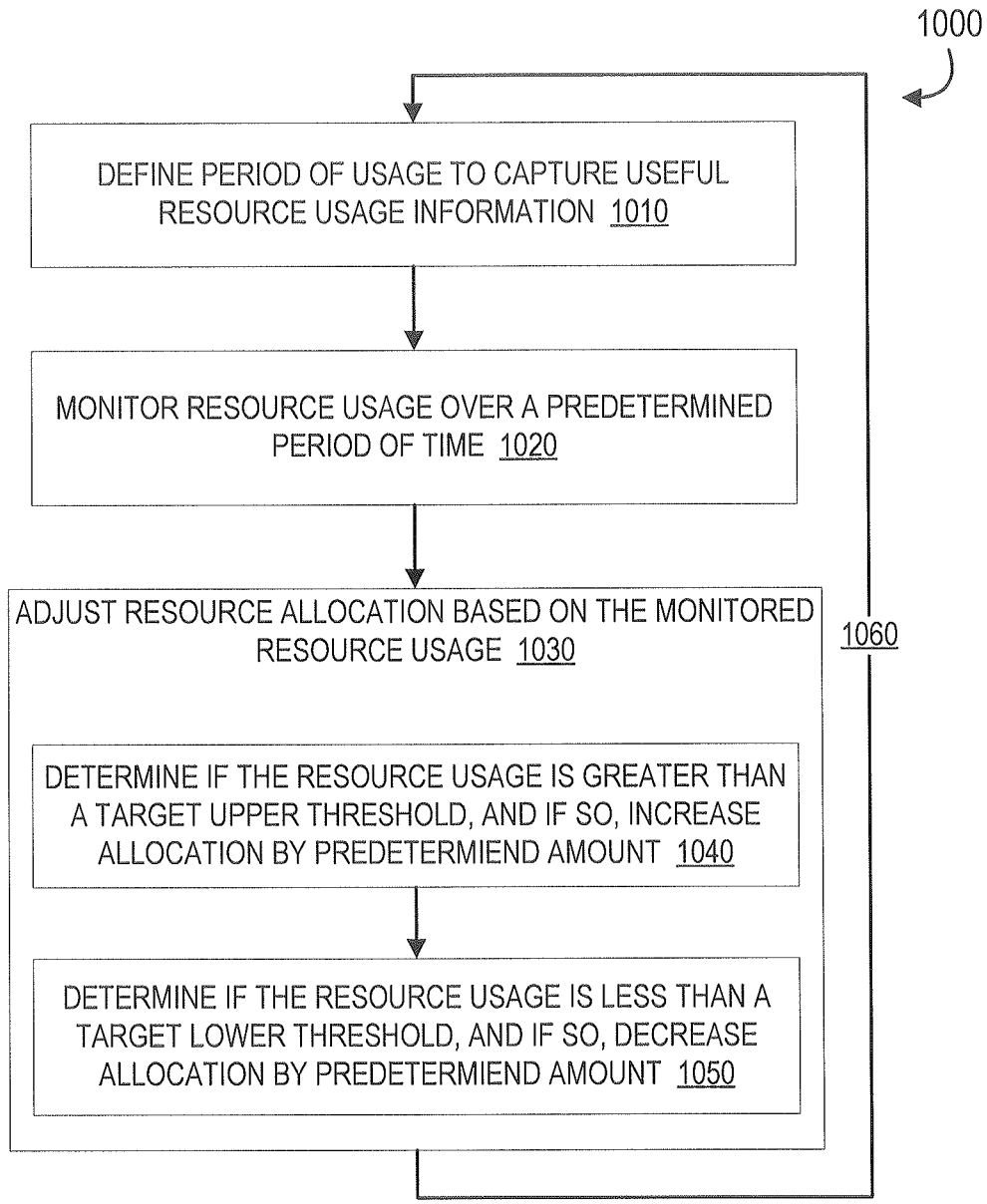

Having thus described embodiments of the invention in general terms, reference will now be made the accompanying drawings, wherein:

FIG. 1 illustrates an ETE system 100 by way of a compute hosting program environment abstraction 110 according to embodiments of the invention;

FIG. 2 illustrates the resource management layer 130 originally presented in FIG. 1 in greater detail and according to embodiments of the invention;

FIG. 3 illustrates a flowchart of a method 300 for building a platform according to embodiments of the invention;

FIG. 4 illustrates a flowchart of a method 400 for potential post-build processing;

FIG. 5 illustrates an information technology infrastructure 500 according to embodiments of the invention;

FIG. 6 illustrates intelligent management of the provisioning of resources within the information technology infrastructure 600, in accordance with embodiments of the invention;

FIG. 7 is a block diagram that illustrates a cloud computing system environment 700 wherein various systems of the invention and various methods of the invention operate according to embodiments of the invention;

FIG. 8 is a block diagram that illustrates the modular IT application 709 originally presented in FIG. 7 in greater detail according to embodiments of the invention;

FIG. 9 is a flowchart that illustrates a method 900 for capacity reclamation and resource adjustment (CRRA) according to embodiments of the invention; and FIG. 10 is a flowchart that illustrates a successive approximation method 1000 according to embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the term "information technology data" as used herein includes any data that may be needed for an entity to provide information technology infrastructure. For example, this data may include software, hardware, memory, storage, programs, operating systems, programming notes, instructions, output resulting from the use of any software program, including word processing documents, spreadsheets, database files, charts, graphs and outlines, electronic mail or "e-mail," personal digital assistant ("PDA") messages, instant messenger messages, source code of all types, programming languages, linkers and compilers, peripheral drives, PDF files, PRF files, batch files, ASCII files, crosswalks, code keys, pull down tables, logs, file layouts and any and all miscellaneous files or file fragments, deleted file or file fragment. Information technology data may also include any and all items stored on computer memory or memories, hard disks, floppy disks, zip drives, CD-ROM discs, Bernoulli Boxes and their equivalents, magnetic tapes of all types and kinds, microfiche, punched cards, punched tape, computer chips (including but not limited to EPROM, PROM, ROM and RAM of any kind) on or in any other vehicle for digital data storage or transmittal, files, folder tabs, or containers and labels appended to or associated with any physical storage device associated with each original and each copy. In accordance with embodiments of the invention, the term "information technology infrastructure" as used herein refers to the totality of interconnecting hardware and software that supports the flow and processing of information. Information technology infrastructures include all information technology data, physical components, and the like that make up the computing, internet communications, networking, transmission media, etc. of an entity.

Furthermore, embodiments of the present invention use the term "user." A user may be an individual, financial institution, corporation, or other entity that may require electronic data, software, and/or hardware though an information technology infrastructure. Embodiments of the present invention also use the term "vendor" to describe a company, business, individual, or other entity that provides systems, software, hardware, and other technology required for operation of an entity.

Although some embodiments of the invention herein are generally described as involving a "financial institution," other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of entities that have an information technology infrastructure.

According to embodiments of the invention, an end to end modular information technology system (ETE system) provides responses to requests for service. A user or entity may submit a request for a build of a platform of one or more functional information technology (IT) servers. The request for the build may involve a unique configuration for the platform. A "platform" refers to a set of one or more servers to be built, being built or previously built to a specific configuration. The platform for a requested build may be chosen from a collection of predefined common configurations or may be customized by the requester. The platform for a build may also be chosen from a collection of predefined templates and customizable features may then be added as desired. Some components of the platform may include the number of virtual central processing units (CPUs), the amount of memory and the amount of storage to be included in one or more of the IT servers. The ETE system, in order to determine and configure the proper amount of storage for the platform, for example, calls the storage black box system (SBB), which accepts detailed input from the requester and/or the ETE system in order to configure the necessary number of unique storage components and their respective parameters. Once the requester has specified the parameters of the needed platform, the ETE system builds one or more useable servers as requested. The ETE system is discussed in concurrently filed patent application Ser. No. 13/678,415, entitled "End to End Modular Information Technology System", which is assigned to the assignee of this application and is incorporated by reference in its entirety herein.

The one or more servers of the platform may be virtual or physical servers. A virtual or logical server may be built using a hypervisor that functions similarly to an operating system and allows multiple servers to run on one machine as though they were each individually running on a unique physical machine. In this scenario the end user cannot tell whether the server(s) being used are virtual or physical. In applications requiring less processing power or memory, such virtual servers may be stacked on one physical box, or in a situation where high performance is needed, a very large, very high performance physical machine may be built to the specifications of the requester. In this regard, the ETE system is considered to include a modular process for building servers. Among other benefits, the ETE system, in conjunction with the Orchestration Management Database, the Host Naming Application Programming Interface, the Storage Black Box and the Capacity Reclamation and Resource Adjustment Systems, provides streamlined building of servers based on a configuration associated with a particular requested platform. For example, in various instances the time from build request to completed build may be approximately 30 minutes to three hours whereas the process prior to implementation of the ETE system and its tools may take 60 to 90 hours to complete.

Embodiments of the invention are directed to a system, method, or computer program product for providing capacity reclamation of resources allocated to one or more virtual machines. The invention monitors resource usage of the one or more virtual machines over a predetermined period of time, compares resource usage to resource allocation; and, based on the comparison of the resource usage to the resource allocation, adjusts resource allocation based on the monitored resource usage. Comparing the resource usage may include comparing resource usage to a target upper threshold percentage of allocated resources, and if the resource usage exceeds the target upper threshold, increasing the allocated resources by a predetermined amount and comparing resource usage to a target lower threshold percentage of allocated resources, and if the resource usage is less than the target lower threshold, decreasing the allocated resources by a predetermined amount.

Referring now to FIG. 1, an ETE system 100, which may be operating using cloud computing, is illustrated by way of a compute hosting program environment abstraction 110. The abstraction 110 has three layers including an automation intelligence workload manager 120, a resource manager 130 and a physical infrastructure 140. The workload manager 120 is configured to balance the workload of the various components of the resource management layer 130 and/or the components of the physical infrastructure 140. The resource management layer 130 represents an isolation and compartmentalization of specific functions needed to manage the physical device or devices of the physical infrastructure 140 so that efficiency of use of the physical device(s) is maximized. Each of the specific functions of the resource management layer 130 are represented by one of the boxes illustrated in FIG. 2 and is considered a stand-alone component despite the possibility that each of the specific functions, in various embodiments, may be performed by a standalone physical computing device or multiple physical computing devices in collaboration. In various embodiments, one or more physical computing devices may function as a single component or system of the ETE system 100, such as the OMDB, and in some embodiments a single component or system of the ETE system 100 may perform one or several of the specific functions discussed with reference to FIG. 2 and/or other functions.

Referring now to FIG. 2, the resource management layer 130 originally presented in FIG. 1 is shown in greater detail. The resource management layer 130 includes several boxes representing specific, modular functions categorized as various resource managers (RMs) of the ETE system 100. The first box represents a server provisioning RM 202. The server provisioning RM 202 functions similarly to a person directing traffic. When a request for service is received by the ETE system 100, RM 202 recognizes the request and then instructs the various systems and components of the ETE system 100 regarding timing of processes. The RM 202 is, in some embodiments, an open source package that sequentially manages the service request. The RM 202 receives the input parameters for the build from the requester and is used to automate the "build" servers and operating system configuration based on those input parameters.

The next box represents a storage provisioning RM 204. In some embodiments, the storage provisioning RM 204 is or includes the Storage Black Box (SBB) system, which is discussed in concurrently filed patent application Ser. No. 13/678,419, entitled "Storage Black Box System", which is assigned to the assignee of this application and is incorporated by reference in its entirety herein. Storage provisioning RM 204 provides for the automated creation, expansion, contraction and deletion of storage allocations for hosts. The storage allocations may be or include network file system (NFS) storage (or network-attached storage or Internet Protocol storage), fiber channel storage (or Storage Area Network (SAN)), or virtual storage. The storage provisioning RM 204 is initiated by the server provisioning RM 202, which calls RM 204 and passes necessary parameters from a requester's service request to RM 202.

The next box represents a virtual machine/hypervisor management RM 206. RM 206 describes the aggregate functionality for building virtual machines (VMs). Thus, if the build requires one or more virtual machines to be built rather than a more traditional physical server or "bare metal machine", then RM 206 communicates through one or more hypervisors for interacting with the virtual machine. RM 206 manages multiple sequential steps that must be taken to prepare for creating the virtual machine and to build and manage the virtual machine.

The next box represents a cloud intelligence RM 208. RM 208 provides vision into the building process by communication with the hypervisor and/or other components. In some embodiments, the ETE system 100 creates a temporary virtual construct called a shell to facilitate the build of a virtual machine. RM 208 communicates with and gains intelligence from the shell for use by other resource managers or for presentation to a user.

The next box represents a power management RM 210. RM 210 controls the power of resources being used during the building process. For example, RM 210 may control power up, power down, standby, idle and reboot of physical machines being used during the building process. For example, an automated build may require multiple reboots.

The next box represents a cloud usage tracking RM 212. RM 212 provides vision into numerous parameters for each virtual machine being used in the build process. In some embodiments, RM 212 uses an orchestration management database (OMDB), which is discussed in concurrently filed patent application Ser. No. 13/678,029, entitled "Orchestration Management of Information Technology", which is assigned to the assignee of this application and is incorporated by reference in its entirety herein. In short, the OMDB is a single, authoritative source for accurate data or metadata storage and retrieval. In some scenarios, the OMDB maintains data regarding over one hundred parameters associated with a single virtual machine, and RM 212 provides usage tracking information regarding the virtual machine based on the metadata provided by the OMDB. Examples of parameters tracked by RM 212 using the OMDB include when the VM was created, how long has it been running, how much physical storage, how much virtual storage, identity of requester, when was the last time the VM performed a specific function and the like. Any of these parameters may be provided to the user of the ETE system using RM 212 to retrieve metadata stored in the OMDB.

The next box represents a network automation RM 214. RM 214 provides an interface whereby the ETE system can register, add, change, delete or otherwise manipulate domain name system (DNS) and Internet Protocol (IP) data. RM 214 presents a host name for an IP address match and promulgation to the network. In order for the machine being built to be recognizable to the network, it must be matched with an IP address and that IP address must be promulgated through the network so that it is known.

The next box represents an identity management RM 216. RM 216 provides access management functionality. For example, once the server has been fully built and turned over to the requester, RM 216 ensures that the requester (and/or any other authorized person) is granted access to the server.

The next box represents a cloud configuration management RM 218. RM 218 tracks and shares configuration and placement of all resources. In some embodiments, RM 218 is or includes the OMDB. RM 218 represents the configuration of the OMDB such that metadata regarding each of the VMs is stored and retrieved appropriately. The next box represents a system management integration RM 220, which in some embodiments, is or includes the OMDB. RM 220 provides two different types of communication, namely, data may be published and may be submitted. A requester can submit a demand for data as it is needed using various methods of access. RM 220 also represents a near real-time copy of the data that is stored in an off-line database so that any external system or user who needs access to the data may get it without impacting the performance of the "real-time" production copy of the data being used in the build process.

The next box represents a compute resource analysis RM 250. In some embodiments, RM 250 provides administrators an opportunity to perform preventive maintenance on the ETE system. For example, the administrator may run some tests designed to stress the infrastructure and the virtual machines to ensure no problems exist. RM 250 may detect patterns or conflicts, systems that should not be within the ETE system environment (e.g., because they consume too many resources).

The next box represents an application build and launch RM 252. RM 252 provides multiple ways to put an application on a server. Once the ETE system has built a platform, which generally includes the network, host name, working server with operating system and any un-configured database or middleware, applications may need to be installed for the server(s) to be ready for use by the business. In some embodiments, the RM 252 must pull down one or more applications from an external system. The ETE system is considered an "open" system, i.e., it functions in an open format such that it may access any type of external system.

Additionally, the ETE system periodically performs quality assurance checks throughout the build process. For example, if a requester requests a basic server with a common operating system for hosting a website, the ETE system builds the virtual server through the automated process without further manual input after the platform parameters have been input by the requester. The ETE system may build the server to a certain point, reboots the server, does some additional work, reboots the server again, and throughout performs periodic QA checks on the server to ensure appropriate parameters are met. If the build passes the QA check, then the process continues, and if the build does not pass the QA check, then the process remediates the problem.

Referring now to FIG. 3, a flowchart illustrates a method 300 for building a platform according to embodiments of the invention. The first step, as represented by block 302, is receiving a service request for a platform build, and the second step, as represented by block 304, is receiving platform parameters from the requester. In various embodiments, the service request may be received in different ways. For example, a user may access an intranet or Internet page including a form having multiple questions and/or fields for inputting information regarding the request for service or build request. In other embodiments, a user may prepare a document or message including parameters for a service request and the document may be manually or automatically received and processed in order to extract the parameters for the service request. For example, the document or message may be scanned and key words extracted so that the parameters for the service request may be known or determined. In some instances, after such an automated extraction, the user is asked to confirm the parameters in some way, such as by email, message, phone call or otherwise. In some embodiments, the requester is not a person or entity, but rather is a software module, resource manager or other automated requester. For example, in some embodiments, a software module is configured to recognize when a line of business requires one or more additional servers and to determine the parameters necessary for the additional servers to fill the needs of the line of business.

The next step, as represented by block 306, is to determine whether the service request requires any standalone physical machine and/or any virtual machines. In some instances, the requester may indicate a preference for one or the other. For example, in one instance, a requester may specify that they want a single physical machine in response to the service request. In other instances, where the requester does not specify or where the requester may specify that the ETE system should take the build the most efficient machine(s) possible, the system typically determines that one or more virtual machines or virtual servers will be appropriate end products of the build. The next step, as represented by block 308, is to initiate a build of one or more physical machines based on the received parameters in the case where it is determined that one or more physical machines is needed. Alternatively, or in combination with step 308, block 310 represents initiating a build of one or more virtual machines based on the received parameters in the case where it is determined that one or more virtual machines is needed.

The next step, as represented by block 312, is provisioning physical and virtual storage based on the received parameters. In some embodiments, the SBB system is used to provision storage. The SBB provides a framework for accepting and managing storage from any external vendor. The SBB is programmed to recognize the specific interface controls for each of the storage vendors and each storage component such that it provides a touch-free, logical provisioning of storage based on the parameters required for the build. For example, a particular platform may include storage provisioned at many different physical sites each utilizing different interface protocols on the cloud.

The next step, as represented by block 314, is provisioning physical and virtual processing power based on the received parameters. The ETE system may determine that a platform requires a specific amount of processing power based on the parameters received and may provision the processing power from one or more processors that match the characteristics required for the processing. For example, the processing speed and the types of calculations that will be required of the server may factor into the provisioning of the processing power. In some embodiments, the processing power is provisioned in a real-time or near-real-time way such that processing power is provisioned as it is needed, and once it is no longer needed for a specific task, it may be reclaimed and either used by one or more other virtual machines for processing or by the same virtual machine for processing a different task, rather than sitting idly and awaiting another processing task similar to the completed task. In this regard, processing resources may be utilized in an extremely efficient manner. This processing allocation or provisioning, reclamation and adjustment is described in further detail beginning with reference to FIG. 8 below.

Referring back to FIG. 3, the next step, as represented by block 316, is creating a shell and building and managing the virtual machines based on the received parameters. The build may involve many steps such as installation of operating systems and other software and configuration changes and/or powering adjustments such as reboots in order for the installations and configurations to function properly. Vision may be provided into the build process by communication with the hypervisors that are managing the virtual machines or from other sources such as the resource managers that are running the build process, as represented by block 318.

The next step, as represented by block 320, is managing power of resources. For example, the power of the various physical components that are being used in the build may be managed. If a virtual machine has an operating system installed on a physical component and that physical component must be restarted for the operating system to become appropriately functional, then the ETE system manages the physical component such that any other virtual machine's resources that are currently utilizing the physical component are either suspended temporarily or transferred to secondary or alternate physical components or resources during the power change. In some embodiments, power is managed on a micro level within a physical component. In other words, the portions of the physical component requiring power change or cycling in order to achieve a goal for one or more virtual machines are manipulated, while the remaining portions of the physical component retain power configurations otherwise running.

The next step, as represented by block 322, is tracking cloud usage associated with parameters for the virtual machines. As discussed above, metadata associated with the virtual machine(s) is stored regularly and can be retrieved as necessary in response to a user request and/or a request from a software module or resource manager. The next step, as represented by block 324, is integrating the platform with network services. This allows the virtual machine to appear to the network, internally and/or externally so that it may be queried, searched, used for processing or otherwise utilized in accordance with its design parameters.

The next step, as represented by block 326, is managing addition and participation of active directory for user authentication. This allows the authorized users to access and use the platform upon completion of the build and also allows for modification of those granted access and their access parameters.

The next step, as represented by block 328, is tracking and sharing configuration and placement of all resources. This step, in some embodiments, involves the OMDB. The OMDB provides for aggregation of vendor and institution data necessary for information technology infrastructure deployment, management, and federation. Utilizing cloud computing technology, the OMDB provides an aggregation of all data necessary for information technology infrastructures within an entity into one useable database that dramatically simplifies the ability to perform core functions and integrate external vendors and components with the entity's information technology infrastructure. In this way, the present invention modularly stores data required for an entity's information technology infrastructure and allows for easy deployment, intelligent monitoring, federation of data, and feedback associated with all aspects of the entity's information technology infrastructure.

Finally, the next step, as represented by block 330, is providing an offline database of near-real-time data for non-build access. In some embodiments, a copy or partial copy of the OMDB or other datastore and/or database used in conjunction with a build process is created and used for offline access of non-build access. This eliminates efficiency drops in the OMDB or other primary data source due to non-build related functions and therefore further increases the speed with which the build takes place.

Referring now to FIG. 4, a flowchart illustrates a method 400 for potential post-build processing. The first step, as represented by block 402, is performing periodic and/or regular checks for problems and analyzing the results of the checks. In instances where problems with the build are detected, the system may then pause the current build process or continue the current build process and perform a remediation concurrently, as represented by block 404.

The last step, as represented by block 406, is building and launching the platform. This build refers to building the desired software into the machines for functionality meeting or exceeding the expectations of the requester based on the requested build parameters. This may include calling external systems using an open format for installing one or more applications to make the machines business ready. Once the software build has been completed, the machines may be launched and used for their intended business purpose.

In various embodiments, a host naming application programming interface (HAPI) is used. The HAPI is a new IP service that provides a unique name for the platform on the network. The naming framework accounts for any unique naming schema associated with any of the various systems of the cloud such that no other name provided by the HAPI naming framework will be a duplicate. The name assigned a service request is used for asset tracking, application interaction and it is published as part of the platform's IP address and host name. The HAPI is described in concurrently filed patent application Ser. No. 13/678,424, entitled "Host Naming Application Programming Interface", which is assigned to the assignee of this application and is incorporated by reference in its entirety herein.

As illustrated in FIG. 5, the automation intelligence workload manager 120 of FIG. 1 may monitor the systems within the information technology infrastructure 500, which may also be referred to as or be part of the "cloud" as referred to herein, which functions over and using a network 502. In the illustration of FIG. 5, there are three different virtual local area networks (VLAN) 510 illustrated. Any number of VLAN may be present within the information technology infrastructure. As illustrated, VLAN1, VLAN2, and VLANx all include multiple hypervisors 512 within each of the VLANs. The hypervisors 512 are virtual managers of individual virtual machines within an information technology infrastructure. The hypervisors 512, for example, may provide the OMDB with an indication as to the use of the information technology data within each virtual machine. As illustrated in FIG. 5, one of the hypervisors 514 within VLANx is only using a limited amount of the information technology data deployed to the virtual machine associated with the hypervisor 514. Because the OMDB interacts with resource managers and/or an automation intelligence workload manager that is capable of monitoring each of the information technology components or infrastructures, including the network 502, VLANs 510, individual hypervisors 512, 514 associated with each virtual machine, the ETE system is capable of determining which virtual machines may be over capacity or under capacity with respect to the information technology data the virtual machine is utilizing. Also shown in the infrastructure 500 is the storage 506, such as the SBB, the storage controller 508 and a SAN fabric 504, which is the hardware that connects workstations and servers to the storage 506. The SAN fabric 504 enables any-server-to-any-storage device connectivity through the use of Fibre Channel switching technology.

FIG. 6 illustrates intelligent management of the provisioning of resources within the information technology infrastructure 600, in accordance with embodiments of the invention. The automation intelligence workload manager 602 may continually update workload, resources, and state, as illustrated in block 604, by being in constant communication with the virtual machines through the system's hypervisors 605, 606, 608, 610. As illustrated, the hypervisors are monitored to determine the amount of resources (e.g., storage and processing power) being used by each virtual machine and/or other system within the information technology infrastructure. The automation intelligence workload manager 602, in this embodiment, provides a monitoring display of all the hypervisors within an information technology infrastructure for the user to monitor. As discussed herein, software modules or resource managers may also request information regarding the status of current resources being utilized by each individual virtual machine.

As illustrated in FIG. 6, a monitoring display illustrates several different statuses within each hypervisor. A hypervisor that is utilizing approximately half of its designated resources is illustrated as hypervisor 605. A hypervisor that is utilizing all of its designated resources is illustrated as hypervisor 610. A hypervisor that is using none of its designated resources is illustrated as hypervisor 606. A hypervisor that is using one third of its designated resources is illustrated as hypervisor 608. In each of these cases the ETE system may be able to drill down within each hypervisor to determine specifically what resources are being utilized and what resources are available for reclamation and re-allocation. In this way, the ETE system may pinpoint specific resources, such as a particular program, memory, etc. that is not being utilized, and re-allocate it to a new purpose. Furthermore, the monitoring of the information technology infrastructure allows for monitoring of every information technology infrastructure component built, the information technology data used for the builds, the data on the cloud, the inventory available, capacity available, performance, billing, building sequences, etc. that may be necessary to build and/or operate an information technology infrastructure for an entity.

In some embodiments, the monitoring of individual hypervisors with the ability to drill down to the individual resources being utilized by the a virtual machine may further allow the ETE system to provide feedback with respect to the operational status of the virtual machine and/or resources associated with it. For example, the monitoring of a virtual machine may recognize an error or virus within data or resources within a single virtual machine. As such, the recognized error may be sent in the form of feedback to a user or other individual, such that the error may be monitored and/or remediated to ensure smooth operation of the rest of the information technology infrastructure.

Referring now to FIG. 7, a block diagram illustrates a cloud computing system environment 700 wherein an ETE system 701, a storage black box system 703, an OMDB system 704 and/or other components and/or systems of the invention and the various methods of the invention operate according to various embodiments.

A cloud 702 may allow for on-demand network access to a shared pool of configurable resources provided by the OMDB 704, user system 708, vendor systems (not shown), the ETE system 701, the SBB system 703 or otherwise. These resources may include but are not limited to hardware, software, networks, servers, storage, services, applications, systems, programs, packages, etc. and updates or programs to operate the same. The ETE system allows for these resources to be rapidly provisioned and released within the modular system. The network access may be a global area network (GAN), such as the Internet, a wide area network (WAN), a local area network (LAN), or any other type of network or combination of networks. The network may provide for wireline, wireless, or a combination wireline and wireless communication between devices on the network.

In some embodiments, resources and data may be stored on the cloud 702 and not at a local computing device, such that the memory of the local computing device is not affected by the work associated with the resources on the cloud 702. Furthermore, the cloud 702 may provide processing capabilities, such that the user may access processing power and/or other resources from the cloud 702 and not on his/her local computing device. In this way, a shared pool of resources may be accessed, processed, and stored by users of the cloud computing environment 700 all within the cloud 702. In some embodiments, the OMDB 704 may store data that may be accessible via the cloud 702. In this way, the data and associated resources may be stored on the cloud 702.

The cloud 702, in some embodiments, may take the form of several different service and/or deployment models as required by the managing entity of the cloud 702. The service models include, but are not limited to cloud software as a service, cloud application as a service, cloud platform as a service, and count infrastructure as a service. Cloud software as a service model provides the user with the ability to run programs and applications on the cloud infrastructure as opposed to the user system 708. Cloud application as a service is similar to cloud software as a service, but in this model the user is able to specify and save customer server configurations and application templates. Cloud platform as a service allows a user to be able to deploy onto the cloud user-created or acquired applications and programs. Cloud infrastructure as a service allows a user to control portions of the cloud's operating systems, deployment applications, storage, networking, and other fundamental computing resources of the cloud 702.

The deployment models may include, but are not limited to private model, public model, community model, and hybrid model. In some embodiments, the cloud 702 may be provided in a private model. The private model allows the cloud 702 to only be used only be a single entity. In some embodiments, the cloud 702 may be provided in a public model. The public model allows the cloud 702 to be available to the public or to multiple entities. In some embodiments, the cloud 702 may be provided in a community model. The community model allows the cloud to be accessed and/or used by a group of related entities. In some embodiments, the cloud 702 may be provided in a hybrid model. In the hybrid model the cloud 702 may be used both publicly and privately based on the provider's requests 702 may each be utilized for the cloud 702 associated with the ETE system 701. However, some models may require more monitoring than others. For example, in the public deployment model, a larger number of users may access the cloud 702 and therefore there is more likely going to be a security issue, simply based on the number of individuals who have access to the cloud 702 and the data or applications located on the cloud 702. In some embodiments, a private cloud 702 may provide the most security protection to an entity such as a financial institution and other users of the cloud 702.

In some embodiments, the user is an individual. The individual may be an associate and/or other employee within a financial institution. In other embodiments, the user may be a financial institution, government organization, corporation, or other entity with an information technology infrastructure. The user may wish to retrieve vendor provided data off of the cloud 702 for use on his/her user system 708. In some embodiments, the user may be provided with data from the cloud 702 via one or more of the other systems in the environment 700.

An end to end system (ETE) system 701 is a computer system, server, multiple computer systems and/or servers or the like and may include one or more of the other system and/or components shown in FIG. 7. The ETE system 701 may be part of the cloud 702 rather than merely connected to it. The facility management system 701, in the embodiments shown has a communication device 712 communicably coupled with a processing device 714, which is also communicably coupled with a memory device 716. The processing device is configured to control the communication device 712 such that the facility management system 701 communicates across the network 702 with one or more other systems. The processing device is also configured to access the memory device 716 in order to read the computer readable instructions 718, which in some embodiments includes a modular IT application 709. The memory device 716 also has a datastore 719 or database for storing pieces of data for access by the processing device 714.

The modular IT application 709 is configured for instructing the processing device 714 to perform various steps of the methods discussed herein, and/or other steps and/or similar steps. In various embodiments, the modular IT application 709 is included in the computer readable instructions stored in a memory device of one or more systems other than the ETE system 701. For example, in some embodiments, the modular IT application 709 is stored and configured for being accessed by a processing device of one or more other systems connected with the ETE system 701 through cloud 702.

An OMDB system 704 is configured for storing information as detailed herein. The OMDB system 704 is a computer system, server, multiple computer system, multiple servers, a mobile device or some other computing device configured for use by the ETE system 701 in conjunction with the methods discussed herein. The OMDB 704 may have a communication device 722 communicatively coupled with a processing device 724, which is also communicatively coupled with a memory device 726. The processing device 724 is configured to control the communication device 722 such that the OMDB system 704 communicates across the cloud 702 with one or more other systems. The processing device 724 is also configured to access the memory device 726 in order to read the computer readable instructions 728, which in some embodiments include an OMDB application 720. The memory device 726 also has a datastore 729 or database for storing pieces of data for access by the processing device 724 and other components, virtual machines and systems of the environment 700. The OMDB application 720 is configured to provide a secondary near-real-time copy of the data for non-build usage as discussed herein and/or other functions.

The storage black box (SBB) system 703 is configured for providing storage for one or more of the pieces of data used by the ETE system 701 when running the modular IT application 709 as discussed herein. In some embodiments, the SBB system 703 includes a communication device 742 communicatively coupled with a processing device 744, which is also communicatively coupled with a memory device 746. The processing device 734 is configured to control the communication device 742 such that the SBB system 703 communicates across the cloud 702 with one or more other systems. The processing device 744 is also configured to access the memory device 746 in order to read the computer readable instructions 748, which in some embodiments include instructions for communicating with the ETE system 701, and in some embodiments, includes some or all of the modular IT application 709.

The user system 708 is configured for providing access to the ETE system 701 and/or the other components, virtual machines and/or systems of the environment 700 when running the modular IT application 709 as discussed herein. In some embodiments, the user system 708 includes a communication device 732 communicatively coupled with a processing device 734, which is also communicatively coupled with a memory device 736. The processing device 734 is configured to control the communication device 732 such that the user system 708 communicates across the cloud 702 with one or more other systems. The processing device 734 is also configured to access the memory device 736 in order to read the computer readable instructions 738, which in some embodiments include instructions for communicating with the ETE system 701, and in some embodiments, includes some or all of the modular IT application 709. In some embodiments, the user system also includes a datastore 739.

In various embodiments, one of the systems discussed above, such as the ETE system 701, is more than one system and the various components of the system are not collocated, and in various embodiments, there are multiple components performing the functions indicated herein as a single device. For example, in one embodiment, multiple processing devices perform the functions of the processing device 714 of the ETE system 701 described herein. In various embodiments, the ETE system 701 includes one or more of the OMDB system 704, the SBB system 703, and/or any other system or component used in conjunction with or to perform any of the method steps discussed herein.

Referring now to FIG. 8, the modular IT application 709, which may be stored in the cloud 702 in one or more memory devices, for example memory device 716, as computer readable instructions, for example computer readable instructions 718, may include computer readable instructions forming a capacity reclamation and resource adjustment (CRRA) application 810 and/or a host naming application programming interface (HAPI) application 820. In various embodiments, the CRRA application 810 and/or the HAPI application 820 are embedded in the end to end system 701 and used during a build of a platform and/or during multiple platform builds for improving efficiency and subsequent accuracy of network communication, respectively. The CRRA application 810 and/or the HAPI application 820 may be completely stored and executed on one device or portions of one or both may be stored and/or executed on multiple devices and/or over the cloud 702.

Referring now to FIG. 9, a flowchart illustrates a method 900 for capacity reclamation and resource adjustment (CRRA). Some or all the steps discussed with reference to FIG. 9, and in some embodiments, one or more fewer or additional steps are embodied in computer-readable instructions such as the CRRA application 810. The framework of the ETE system and the processes discussed above, as well as related concepts such as the SBB system enable the CRRA, which is a process by which the resources being used for a VM or set of VMs is reclaimed into a pool of resources immediately when those resources are no longer being used by the VM(s). Once the resources are added into the resource pool, they may be reallocated, that is, they may be used in another build process for another VM or platform. In some cases, a completely new VM is not built, but rather, additional necessary resources are earmarked and utilized in a previously built VM or VMs. For example, additional storage or processing power may be added to a pre-existing VM without killing the pre-existing VM. This may allow the VM to continue to function appropriately and efficiently without down times in its functionality. Additionally, CRRA functionality may provide for regular and/or periodic monitoring of resource usage in order to adjust the amount of resources allocated to one or more VMs, either to increase or decrease allocation.

Referring now to FIG. 9, the first step, as represented by block 910, is receiving resource parameters from the requester. As discussed above with reference to FIG. 3, the requester may be a person, entity or software module and/or hardware component, and the parameters may define the amount of one or more types of resources believed to be needed for a requested platform. In many instances, an individual, line of business within an entity or an entity provides resource parameters for a platform to be built that are high, and sometimes drastically high, estimates of the amount of, for example, storage and processing necessary for one or more requested virtual machines. Thus, as represented by block 920, the system may selectively provision resources for the platform build. This may be based entirely on the received parameters, partly on the received parameters or not at all on the received parameters. For example, in a case where the system provisions resources entirely on the received parameters, the system may allocate the requested storage and the requested processing for a virtual machine to be built.

In a case where the system provisions resources based partially on the received resource parameters, the system may allocate resources based on an algorithm that determines what resources should be based at least in part on the received parameters. For example, in some instances, the type or character of the virtual machine, that is, some information regarding its intended use is received as a parameter, and the resources are allocated based on the type or character of the virtual machine to be built. As a specific example, if the virtual machine will function as a web server as indicated from the received parameters, then there may be a predetermined amount of resources to be allocated for a web server virtual machine such as one processor and one gigabyte of storage. In a case where the system provisions resources without regard to the received parameters, the resources may be allocated based on an algorithm to determine the proper resources or may simply be based on a standard predetermined amount of resources. In some embodiments, the resources are allocated as zero processing and/or zero storage and/or the zero of one or more other types of resources. In such a scenario, the system may monitor need for the resources, and upon a need existing, an imminent need or a confirmed predicted need, an existing virtual machine or a new virtual machine may be allocated resources to meet the need. For example, a virtual machine may be built without any storage, but once a storage need is confirmed, the virtual machine may be modified to include the needed amount of storage.

The next step, as represented by block 930, is monitoring resource usage over a predetermined period of time. The system may monitor how much of a particular resource a virtual machine is actually using. For example, the system may monitor the peak usage, the average usage or otherwise. Based on the monitored resource usage, the system may adjust the resource allocation, as represented by block 940. The system may collect data regarding the usage and continuously or substantially continuously analyze the data to determine the usage of the resource such that, in the case additional capacity of a resource is determined to be necessary, the system may supplement the allocation of the resource for the virtual machine. Conversely, in the case less capacity of a resource is determined to be necessary, the system may reduce the allocation of the resource for the virtual machine. In some instances, the necessary capacity of a resource is determined based on an average or some other amount representative of the need over time. For example, the necessary capacity of the resource may be determined by taking the average of the use of the resource over a period of time and adding a buffer amount to account for any potential spikes in demand for the resource.

In some embodiments, an increase or spike in resource demand may be predicted, and in some cases, confirmed either with the virtual machine or with an administrator of the virtual machine such that a supplemental build may occur, thereby providing semi-permanent (as opposed to permanent—due to possible reclamation) or temporary supplemental resources to the virtual machine to account for the future increase or spike in resource demand.

In some embodiments, a sustained decrease in resource demand may detected, and in some cases, confirmed either with the virtual machine or with an administrator of the virtual machine such that a reduction in resources allocated to the virtual machine may be made. In some embodiments, when a sudden, unpredicted spike in resource demand is detected, a backup resource allocation may be in place such that the virtual machine may draw from the pool of available resources and/or from a pool of backup available resources. The pool of backup available resources may be maintained at a predetermined minimum level of resources that are shared as backup resources across several or many virtual machines, which potentially account for all the machines associated with a line or business, multiple lines of business or a location, a region, or an entire entity.

The next step, as represented by block 950, is detecting that one or more virtual machines being monitored have completed one or more tasks assigned to them. In some cases, a virtual machines completes some or all the tasks that it has been assigned. For example, if the virtual machine was built to serve as a web server for a website but is being replaced by another web server, then it can be predicted that the virtual machine will no longer be needed to perform its intended purpose. Thus, once the virtual machine has fulfilled its finite duties, the resources allocated to the virtual machine may be reclaimed and immediately placed in the pool of available resources for re-allocation to one or more other virtual machines. In some embodiments, less than all the virtual machine's intended tasks are completed, and therefore, only the resources that were needed only for those tasks may be reclaimed. That is, the resources that are still required for the virtual machine to perform its other duties remain allocated to the virtual machine. In some embodiments, when the system detects that a virtual machine has completed one or more tasks, the system may confirm that the virtual machine has completed the task by requesting confirmation from the virtual machine or from an administrator of the virtual machine before reclaiming the resources allocated to the virtual machine to perform the task. In some embodiments, the virtual machine is configured to communicate to the system that the virtual machine has completed a particular task (or multiple tasks or all tasks) and, therefore, that resources may be available for reclamation. In some embodiments, the virtual machine communicates which resources are available for reclamation and in other embodiments, the virtual machine only communicates information regarding the tasks that have been completed. In some such embodiments, the system retrieves stored information indicating which resources of the virtual machine may be reclaimed based on the received information regarding the completed task(s).

The next step, as represented by block 960, is, in response to detecting that a virtual machine has completed a task, reclaiming some or all the resources the virtual machine had been using to perform the completed task into a pool of available resources. The ETE system may reclaim the resources by reversing the build process and placing or assigning the reclaimed resources into a pool of available resources and/or a pool of backup available resources. In some embodiments, for example, the network address of the storage resources that had been allocated to a virtual machine having completed its finite tasks are mapped away from the virtual machine and into the pool of available resources.

The final step of method 900, as represented by block 970, is re-allocating some or all the resources to one or more new virtual machines and/or one or more existing virtual machines. In some embodiments, some or all the reclaimed resources are retained until needed in the pool of available resources. In the embodiments discussed above where resources may be mapped into the pool of available resources, for example, such resources may be re-mapped to be allocated to a new or pre-existing virtual machine requiring storage resources. In some embodiments, resources are never placed in a pool of available resources, but rather are immediately re-allocated to a new or pre-existing virtual machine that requires additional resources.

In some embodiments, once a virtual machine has completed some or all its tasks, the resources allocated to the virtual machine for completing those tasks may continue to be allocated to the same virtual machine for a period of time. This period of time may be a predetermined period of time or may be based on the tasks that have been completed, a likelihood that the virtual machine will be needed to complete additional tasks or other considerations. In some instances, the resources remain allocated until the system automatically reclaims some or all of them, and in other instances, the resources remain allocated until an administrator of the system and/or the virtual machine inputs an instruction to reclaim them.

In some embodiments, a "successive approximation" (SA) method is used by the system to determine the processing power and memory to be allocated to a virtual machine. This method is based on the current use relative to the current allocation. In some embodiments, the successive approximation method is run daily or at some other regular interval for evaluation of the allocation of resources. The SA method monitors VM processing and memory usage and checks for undersized allocation of resources for virtual machines. In some embodiments, a period of usage is set to review the usage of the resources with respect to the current allocation. For example, a period of thirty days of usage of the virtual machine may be used to analyze the usage of the processing power and memory allocated to the virtual machine.

Referring to FIG. 10, a flowchart illustrates a successive approximation method 1000 according to embodiments of the invention. The first step, as represented by block 1010, is to define a period of usage to capture useful resource usage information. For example, a period of one month may be defined. The next step, as represented by block 1020, is to monitor resource usage over the predetermined period of time. The next step, as represented by block 1030, is to adjust the resource allocation based on the monitored resource usage. This step may include, as represented by block 1040, determining if the resource usage is greater than a target upper threshold, and if so, increasing the allocation by a predetermined amount. Step 1030 may also include, as represented by block 1050, determining if the resource usage is less than a target lower threshold, and if so, decreasing the allocation by a predetermined amount. For example, in one embodiment, the current resource usage is determined and compared to a target upper threshold, which may be 50% of the allocated resources. Thus, if the current resource usage is greater than 50% of the current allocated resources, then the system will increase the allocation by a predetermined amount, such as by 50%. The current resource usage is also compared to a target lower threshold if necessary (if the usage is higher than the target upper threshold, then this step need not take place), and if it is lower than the target lower threshold, then the allocation may be decreased by a predetermined amount. The target lower threshold, for example, may be 30% of the allocated resources, and if the usage is less than 30% of the allocated resources, then the allocated resources may be reduced by a predetermined amount, such as by 50%. As represented by arrow 1060, some or all the steps of the method 1000 may be repeated regularly, such as every day in order to maintain efficient allocation of resources.

In some embodiments, the system generates a resource reclamation detail report, which includes output from the CRRA application such as VM name, cluster, Application name, Technology support contact, management support contact, date of build, days active, total VM memory, amount of VM memory in use, percent of VM memory in use, amount of memory over allocation, target memory, target utilization, and a recommended memory allocation adjustment such as "no change", "demote" or "increase". The report may also include information regarding processing power such as number of CPUs allocated to VM, number of CPUs in use, percentage of allocated CPUs in use, average CPU utilization, target CPUs, target CPU utilization, CPUs over allocation and recommended action to be taken such as "no change", "demote" or "increase". In some instances, the report may be generated for informational purposes only and in others, the report may be generated for an administrator to review the report in order to determine whether to approve the recommended change(s) for resource allocation for one or more VMs.

In summary, embodiments of the invention are directed to a system, method, or computer program product for providing capacity reclamation of resources allocated to one or more virtual machines. The invention monitors resource usage of the one or more virtual machines over a predetermined period of time, compares resource usage to resource allocation; and, based on the comparison of the resource usage to the resource allocation, adjusts resource allocation based on the monitored resource usage. Comparing the resource usage may include comparing resource usage to a target upper threshold percentage of allocated resources, and if the resource usage exceeds the target upper threshold, increasing the allocated resources by a predetermined amount and comparing resource usage to a target lower threshold percentage of allocated resources, and if the resource usage is less than the target lower threshold, decreasing the allocated resources by a predetermined amount.

The invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that phases of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for providing capacity reclamation of resources allocated to one or more virtual machines, the system comprising:
   a memory device with computer-readable program code stored thereon;
   a communication device;
   a processing device operatively coupled to the memory device and the communication device, wherein the processing device is configured to execute the computer-readable program code to:
      provision resources to one or more virtual machines based partially on received resource parameters, the provisioning comprising:
         receiving resource parameters comprising information indicating an intended use of the one or more virtual machines;
         based on the information indicating the intended use, determining a predetermined type and amount of resources to be allocated for the intended use; and
         based on the predetermined type and amount of resources, allocating a corresponding type and amount of resources to the one or more virtual machines;
      monitor resource usage of the one or more virtual machines over a predetermined period of time;
      compare resource usage to resource allocation;
      based on the comparison of the resource usage to the resource allocation, adjust resource allocation based on the monitored resource usage;
      based on the resource usage, predict future resource demand;
      initiate a supplemental build of one or more second virtual machines, wherein the one or more second virtual machines are allocated temporary supplemental resources; and
      based on a sustained decrease in resource demand, reclaim the temporary supplemental resources and re-allocating them to a pool of available resources.

2. The system of claim 1, wherein comparing resource usage to resource allocation comprises:
   comparing resource usage to a target upper threshold percentage of allocated resources, and if the resource usage exceeds the target upper threshold, increasing the allocated resources by a predetermined amount.

3. The system of claim 1, wherein comparing resource usage to resource allocation comprises:
   comparing resource usage to a target lower threshold percentage of allocated resources, and if the resource usage is less than the target lower threshold, decreasing the allocated resources by a predetermined amount.

4. The system of claim 1, wherein the processing device is further configured to execute the computer-readable program code to:
   detect that one or more of the one or more virtual machines have completed one or more tasks; and
   in response to detecting that one or more of the one or more virtual machines have completed one or more tasks, reclaim some or all the resources allocated to the one or more virtual machines for performing the completed one or more tasks into the pool of available resources.

5. The system of claim 1, wherein the processing device is further configured to execute the computer-readable program code to:
  re-allocate some or all the reclaimed resources to a new virtual machine or an existing virtual machine.

6. The system of claim 1, wherein comparing resource usage to resource allocation comprises:
  comparing resource usage to a target upper threshold percentage of allocated resources, and if the resource usage exceeds the target upper threshold, increasing the allocated resources by a predetermined amount; and
  comparing resource usage to a target lower threshold percentage of allocated resources, and if the resource usage is less than the target lower threshold, decreasing the allocated resources by a predetermined amount.

7. A computer program product for providing capacity reclamation of resources allocated to one or more virtual machines, the computer program product comprising at least one non-transitory computer-readable medium having computer-readable program code portions embodied therein, the computer-readable program code portions comprising:
  an executable portion configured for provisioning resources to one or more virtual machines based partially on received resource parameters, the provisioning comprising:
    receiving resource parameters comprising information indicating an intended use of the one or more virtual machines;
    based on the information indicating the intended use, determining a predetermined type and amount of resources to be allocated for the intended use; and
    based on the predetermined type and amount of resources, allocating a corresponding type and amount of resources to the one or more virtual machines;
  an executable portion configured for monitoring resource usage of the one or more virtual machines over a predetermined period of time;
  an executable portion configured for comparing resource usage to resource allocation;
  an executable portion configured for, based on the comparison of the resource usage to the resource allocation, adjusting resource allocation based on the monitored resource usage;
  an executable portion configured for, based on the resource usage, predicting future resource demand;
  an executable portion configured for initiating a supplemental build of one or more second virtual machines, wherein the one or more second virtual machines are allocated temporary supplemental resources; and
  an executable portion configured for, based on a sustained decrease in resource demand, reclaiming the temporary supplemental resources and re-allocating them to a pool of available resources.

8. The computer program product of claim 7, wherein comparing resource usage to resource allocation comprises:
  comparing resource usage to a target upper threshold percentage of allocated resources, and if the resource usage exceeds the target upper threshold, increasing the allocated resources by a predetermined amount.

9. The computer program product of claim 7, wherein comparing resource usage to resource allocation comprises:
  comparing resource usage to a target lower threshold percentage of allocated resources, and if the resource usage is less than the target lower threshold, decreasing the allocated resources by a predetermined amount.

10. The computer program product of claim 7, wherein the computer-readable program code portions further comprises:
  an executable portion configured for detecting that one or more of the one or more virtual machines have completed one or more tasks; and
  an executable portion configured for, in response to detecting that one or more of the one or more virtual machines have completed one or more tasks, reclaiming some or all the resources allocated to the one or more virtual machines for performing the completed one or more tasks into the pool of available resources.

11. The computer program product of claim 7, wherein the computer-readable program code portions further comprises:
  an executable portion configured for re-allocating some or all the reclaimed resources to a new virtual machine or an existing virtual machine.

12. The computer program product of claim 7, wherein comparing resource usage to resource allocation comprises:
  comparing resource usage to a target upper threshold percentage of allocated resources, and if the resource usage exceeds the target upper threshold, increasing the allocated resources by a predetermined amount; and
  comparing resource usage to a target lower threshold percentage of allocated resources, and if the resource usage is less than the target lower threshold, decreasing the allocated resources by a predetermined amount.

13. A computer-implemented method for providing capacity reclamation of resources allocated to one or more virtual machines, the method embodied in at least one non-transitory computer-readable medium having computer-readable program code embodied therein, the computer-readable program code to cause a computer processor to:
  provision resources to one or more virtual machines based partially on received resource parameters, the provisioning comprising:
    receiving resource parameters comprising information indicating an intended use of the one or more virtual machines;
    based on the information indicating the intended use, determining a predetermined type and amount of resources to be allocated for the intended use; and
    based on the predetermined type and amount of resources, allocating a corresponding type and amount of resources to the one or more virtual machines;
  monitor resource usage of the one or more virtual machines over a predetermined period of time;
  compare resource usage to resource allocation; and
  based on the comparison of the resource usage to the resource allocation, adjust resource allocation based on the monitored resource usage;
  based on the resource usage, predict future resource demand;
  initiate a supplemental build of one or more second virtual machines, wherein the one or more second virtual machines are allocated temporary supplemental resources; and
  based on a sustained decrease in resource demand, reclaim the temporary supplemental resources and re-allocating them to a pool of available resources.

14. The method of claim 13, wherein comparing resource usage to resource allocation comprises:
  comparing resource usage to a target upper threshold percentage of allocated resources, and if the resource usage exceeds the target upper threshold, increasing the allocated resources by a predetermined amount.

15. The method of claim 13, wherein comparing resource usage to resource allocation comprises:
  comparing resource usage to a target lower threshold percentage of allocated resources, and if the resource usage is less than the target lower threshold, decreasing the allocated resources by a predetermined amount.

16. The method of claim 13, the computer-readable program code further to cause a computer processor to:
  detect that one or more of the one or more virtual machines have completed one or more tasks; and
  in response to detecting that one or more of the one or more virtual machines have completed one or more tasks, reclaim some or all the resources allocated to the one or more virtual machines for performing the completed one or more tasks into the pool of available resources.

17. The method of claim 13, the computer-readable program code to cause a computer processor to:
  re-allocate some or all the reclaimed resources to a new virtual machine or an existing virtual machine.

\* \* \* \* \*